Patented Feb. 14, 1950

2,497,730

UNITED STATES PATENT OFFICE 2,497,730

PROCESS OF PREPARING 2-METHYL-3-HYDROXY-4 AMINOMETHYL - 5 - HYDROXYMETHYLPYRIDINE

Dorothea Heyl, Rahway, Stanton A. Harris, Westfield, and Karl Folkers, Plainfield, N. J., assignors to Merck & Co., Inc., Rahway, N. J., a corporation of New Jersey No Drawing. Application July 14, 1944,
Serial No. 545,004

7 Claims. (Cl. 260—297)

This application relates generally to a process for the preparation of chemical compounds; in a particular sense it is concerned with the preparation of compounds having physiological activity similar to that of vitamin B6 (2-methyl-3-hydroxy-4,5-bis(hydroxymethyl)pyridine).

It is known that nutritional factors of uncertain chemical composition, closely related in physiological activity to vitamin B6, possess greater growth-promoting activity for certain organisms than does vitamin B6 itself.

It is now found that the chemical compound, 2 - methyl - 3 - hydroxy - 4 - aminomethyl - 5 - hydroxymethylpyridine, like the above mentioned nutritional factors, has several hundred fold greater growth-promoting activity for certain organisms, for example *S. lactis*, than does vitamin B6.

According to this invention it is found that this chemical compound can be prepared by reacting ammonia with a compound of the formula:

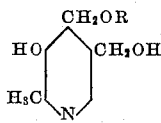

wherein R is alkyl, aryl or arylalkyl. The presently preferred reaction medium is an organic liquid such as an alcohol. Lower aliphatic alcohols, such as methanol, ethanol, and isopropanol, mixtures thereof, or aqueous solutions containing one or more of these alcohols are found to be satisfactory for this purpose.

The optimum temperature for conducting this reaction is in excess of 75° C., for example satisfactory yields of the desired product are obtained at temperatures of the order of 140° C. Lower temperatures decrease the rate of reaction.

The proportions of reactants employed are not critical, but it is preferred to use an excess of ammonia over the required stoichiometrical amount.

The following example illustrates a method of carrying out the present invention, but it is to be understood that this example is given by way of illustration and not of limitation.

Example

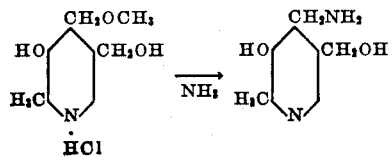

About 30 g. of 2-methyl-3-hydroxy-4-methoxymethyl-5-hydroxypyridine hydrochloride, 400 cc. of methanol, and 400 cc. of liquid ammonia are heated under pressure at about 140° C. for approximately 16 hours. After removing methanol and ammonia under diminished pressure, the residue, consisting of crude 2-methyl-3-hydroxy-4-aminomethyl-5-hydroxymethyl pyridine, is obtained.

The crude product can be purified, for example, by dissolving it in 100 cc. of water, adding sodium hydroxide solution to a pH of about 8–9, removing most of the liberated ammonia under diminished pressure, and cooling the resultant mixture causing precipitation of a yellow product. The yellow product is removed, dissolved in an acid aqueous solution, treated with activated charcoal, filtered, and sodium hydroxide is added yielding the free base, 2-methyl-3-hydroxy-4-aminomethyl-5-hydroxymethylpyridine (M. P. 193–193.5° C.).

Although in this example the 4-methoxymethyl compound is used, it will be understood by those skilled in the art that homologs having a 4-alkoxymethyl, 4-aryloxymethyl, or 4-arylalkoxymethyl substituent, can be used similarly in this reaction to yield the same product.

The free base obtained as above is converted to the corresponding acid salts by reaction with inorganic and organic acids. For example by reacting the base with sulfuric acid, the sulfate salt is obtained and in like manner reaction with hydrobromic acid yields the hydrobromide salt.

The dihydrochloride salt of 2-methyl-3-hydroxy - 4-aminomethyl - 5 - hydroxymethylpyridine (M. P. 226–227° C.) is obtained by reacting an alcoholic solution of the free base with an excess of alcoholic hydrogen chloride solution. Similarly the picric acid salt (M. P. 191–192° C.) is prepared by reacting the free base with picric acid in alcohol.

The compound, 2-methyl-3-hydroxy-4-aminomethyl-5-hydroxymethylpyridine, or salts thereof, can be converted to 2-methyl-3-hydroxy-4,5-hydroxymethylpyridine by treatment with a reagent capable of converting an amino group to a hydroxyl group. For example, to a solution of one gram of 2-methyl-3-hydroxy-4-aminomethyl-5-hydroxymethylpyridine in 13 cc. of N hydrochloric acid is added a solution of about 0.30 g. of sodium nitrite in water. After allowing the solution to stand a few minutes, excess nitrous acid present is destroyed by addition of urea. This solution is concentrated under diminished pressure to yield a crude residue containing 2-methyl-3-hydroxy-4,5-dihydroxymethyl-pyridine hydrochloride (M. P. 207–208° C.). The material thus obtained can be purified by conventional methods.

Modifications may be made in carrying out the present invention without departing from the spirit and scope thereof and the invention is to be limited only by the appended claims.

What is claimed is:

1. The process which comprises heating with ammonia at superatmospheric pressure a compound of the formula

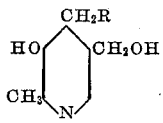

wherein R is selected from the group consisting of alkoxy, arylalkoxy and aryloxy to obtain 2-methyl - 3 - hydroxy-4-aminomethyl-5-hydroxymethylpyridine.

2. The process which comprises treating 2-methyl-3-hydroxy-4-methoxymethyl-5-hydroxymethylpyridine with ammonia at elevated temperature and superatmospheric pressure to produce 2-methyl-3-hydroxy-4-aminomethyl-5-hydroxymethylpyridine.

3. The process which comprises treating 2-methyl-3-hydroxy-4-methoxymethyl-5-hydroxymethylpyridine with ammonia at elevated temperature and superatmospheric pressure in a lower aliphatic alcohol to produce 2-methyl-3-hydroxy - 4-aminomethyl-5-hydroxymethylpyridine.

4. The process which comprises treating 2-methyl-3-hydroxy-4-methoxymethyl-5-hydroxymethylpyridine with ammonia in methanol at elevated temperature and superatmospheric pressure to produce 2-methyl - 3 - hydroxy-4-aminomethyl-5-hydroxymethylpyridine.

5. The process which comprises treating 2-methyl - 3 - hydroxy-4-alkoxymethyl-5-hydroxymethylpyridine with ammonia in methanol at a temperature of the order of 140° C. and superatmospheric pressure to produce 2-methyl-3-hydroxy - 4-aminomethyl-5-hydroxymethylpyridine.

6. The process of preparing 2-methyl-3-hydroxy - 4-aminomethyl-5-hydroxymethylpyridine which comprises treating 2-methyl-3-hydroxy-4-alkoxymethyl - 5 - hydroxymethylpyridine with ammonia in methanol at elevated pressure and a temperature in excess of room temperature, evaporating solvent and recrystallizing the resulting product from alcohol.

7. The process of preparing 2-methyl-3-hydroxy - 4-aminomethyl-5-hydroxymethylpyridine which comprises heating 2-methyl-3-hydroxy-4-alkoxymethyl-5-hydroxymethylpyridine with ammonia at elevated temperatures and at elevated superatmospheric pressure and recovering the thus formed 2 - methyl - 3 - hydroxy-4-aminomethyl-5-hydroxymethylpyridine.

DOROTHEA HEYL.
STANTON A. HARRIS.
KARL FOLKERS.

REFERENCES CITED

The following references are of record in the file of this patent:

Ser. No. 346,568, Zima (A. P. C.), published April 20, 1943.